(12) United States Patent
Yano et al.

(10) Patent No.: US 9,022,226 B2
(45) Date of Patent: May 5, 2015

(54) ZEOLITE SEPARATION MEMBRANE, METHOD FOR PRODUCING THE SAME, AND BONDING AGENT

(75) Inventors: Kazuhiro Yano, Osaka (JP); Yoshinobu Takaki, Osaka (JP)

(73) Assignee: Hitachi Zosen Corporation, Osaka-shi (JP)

( * ) Notice: Subject to any disclaimer, the term of this patent is extended or adjusted under 35 U.S.C. 154(b) by 824 days.

(21) Appl. No.: 12/998,221

(22) PCT Filed: Oct. 1, 2008

(86) PCT No.: PCT/JP2008/067797
§ 371 (c)(1),
(2), (4) Date: Mar. 28, 2011

(87) PCT Pub. No.: WO2010/038281
PCT Pub. Date: Apr. 8, 2010

(65) Prior Publication Data
US 2011/0174722 A1    Jul. 21, 2011

(51) Int. Cl.
*B01D 71/02*   (2006.01)
*B01D 69/04*   (2006.01)
(Continued)

(52) U.S. Cl.
CPC ............ *B01D 65/003* (2013.01); *B01D 63/061* (2013.01); *B01D 69/10* (2013.01);
(Continued)

(58) Field of Classification Search
CPC ..................... C04B 38/00; C04B 2111/00793; C04B 2235/786; C04B 2237/062; C04B 2237/10; C04B 2237/343; C04B 2237/76; C04B 2237/88; C04B 35/00; C04B 35/117; C04B 37/005; C04B 41/5024; B01D 2313/04; B01D 63/061; B01D 65/003
USPC .......... 55/523; 156/89.11; 210/490; 501/134, 501/152, 153
See application file for complete search history.

(56) References Cited

U.S. PATENT DOCUMENTS 4,199,704 A    4/1980 Varshneya et al.
6,402,156 B1 *  6/2002 Schutz et al. ................ 277/316
(Continued)

FOREIGN PATENT DOCUMENTS

| EP | 1914463 A1 | 4/2008 |
|---|---|---|
| EP | 1930067 A1 | 6/2008 |
| JP | 58-006715 A | 1/1983 |
| JP | 8-134434 A | 5/1996 |
| JP | 10-180060 A | 7/1998 |
| JP | 2005-058950 A | 3/2005 |
| JP | 2005-313156 A | 11/2005 |
| JP | 2006-088079 A | 4/2006 |
| JP | 2006-263498 A | 10/2006 |
| WO | WO-01/31078 A2 | 5/2001 |
| WO | WO-02/094727 A1 | 11/2002 |

OTHER PUBLICATIONS

Supplementary European Search Report Mar. 19, 2013, issued for the European patent application No. 08877140.7.

*Primary Examiner* — Dirk Bass
(74) *Attorney, Agent, or Firm* — Locke Lord LLP; James E. Armstrong, IV

(57) ABSTRACT

A separation membrane according to the present invention is characterized by having a porous tube containing an alumina as a main component and an attachment member disposed in a connection position of the porous tube, wherein the porous tube and the attachment member are bonded by a ceramic oxide-based bonding agent containing 17 to 48 wt % of $SiO_2$, 2 to 8 wt % of $Al_2O_3$, 24 to 60 wt % of BaO, and 0.5 to 5 wt % of ZnO as essential components and containing at least one of $La_2O_3$, CaO, and SrO, and a thin zeolite layer is formed on a surface of the porous tube. The attachment member is bonded to the porous tube before the formation of the zeolite layer. Therefore, the bonding agent can have a melting temperature higher than 600° C., which is the upper heatproof temperature limit of the zeolite. Thus, the ceramic oxide material for the bonding agent can be selected from a wider range of compositions such as glass compositions (without limitations on the glass softening temperature).

8 Claims, 4 Drawing Sheets

Particle diameter observation of dense alumina sealant

(51) Int. Cl.
    *B32B 37/06*     (2006.01)
    *C04B 35/14*     (2006.01)
    *B01D 65/00*     (2006.01)
    *B01D 63/06*     (2006.01)
    *B01D 69/10*     (2006.01)
    *C04B 35/117*     (2006.01)
    *C04B 37/00*     (2006.01)
    *C04B 38/00*     (2006.01)
    *C03C 8/04*     (2006.01)
    *C03C 8/24*     (2006.01)
    *C04B 111/00*     (2006.01)

(52) U.S. Cl.
    CPC ......... *B01D 71/028* (2013.01); *B01D 2313/04* (2013.01); *C04B 35/117* (2013.01); *C04B 37/005* (2013.01); *C04B 38/00* (2013.01); *C04B 2111/00793* (2013.01); *C04B 2235/786* (2013.01); *C04B 2237/062* (2013.01); *C04B 2237/10* (2013.01); *C04B 2237/343* (2013.01); *C04B 2237/76* (2013.01); *C04B 2237/88* (2013.01); *C03C 8/04* (2013.01); *C03C 8/24* (2013.01)

(56) References Cited

U.S. PATENT DOCUMENTS

| | | |
|---|---|---|
| 2005/0011358 A1 | 1/2005 | Yamada et al. |
| 2006/0213165 A1 | 9/2006 | Isomura et al. |
| 2008/0054629 A1 | 3/2008 | Sawanura |

\* cited by examiner

Particle diameter observation of dense alumina sealant

Component particle diameter measurement

ZEOLITE SEPARATION MEMBRANE, METHOD FOR PRODUCING THE SAME, AND BONDING AGENT

TECHNICAL FIELD

The present invention relates to a zeolite separation membrane for separating a desired component from a liquid or gas mixture, and particularly to a zeolite separation membrane for use in a plant for fermenting a biomass feedstock such as corn or sugarcane to produce ethanol, for example in an ethanol/water membrane separation apparatus for ethanol purification or a membrane separation apparatus for removing water from an aqueous organic solvent to obtain a high-concentration organic solvent. The invention also relates to a method for producing the separation membrane and a bonding agent used therein.

BACKGROUND ART

The following conventional technologies are known as a method for connecting a tube to an end of a zeolite separation membrane or sealing the end.

Patent Document 1 describes a tube end connection structure having a ceramic tube containing a zeolite film, a metal tube connected to the ceramic tube, and an elastic or flowable material applied over outer surfaces of one end of the ceramic tube and one end of the metal tube.

Patent Document 2 proposes a composition for sealing an end of an inorganic separation membrane, which exhibits airtightness and strength at a high temperature, contains 15 to 20 wt % of $SiO_2$, 3 to 5 wt % of $Al_2O_3$, 15 to 25 wt % of $B_2O_3$, and 55 to 65 wt % of PbO, and has a softening point of 400° C. to 600° C.

Patent Document 3 describes a method containing screwing a fixing member, thereby pressing a ring-shaped sealant (O ring/metal ring) to clog an end of a tube-shaped separation member.

Patent Document 4 propose a porous ceramic body composed of an alkali-free glass, which contains 55 to 65 mol % of silica, 1 to 10 mol % of zirconia, and at least one alkaline-earth metal oxide selected from the group consisting of calcia, baria, and strontia, and is substantially free from zinc oxide.
Patent Document 1: JP-A-2006-88079
Patent Document 2: JP-A-10-180060
Patent Document 3: JP-A-2005-313156
Patent Document 4: JP-A-2006-263498

DISCLOSURE OF THE INVENTION

Problems that the Invention is to Solve

However, in the structure of Patent Document 1, coating agent is used as a base for applying the covering material corresponding to the shape roughness of the ceramic surface. In operation of an apparatus containing the structure, a component of the coating agent can be eluted to adversely affect the zeolite separation membrane. Furthermore, the sealing process using the coating material disadvantageously requires relatively long operation time and technical proficiency.

In Patent Document 2, the glass composition containing a large amount of lead oxide is softened to seal the membrane at a temperature of 600° C. or lower. Therefore, the lead oxide can be eluted into a product such as ethanol to adversely affect health or environment. Furthermore, the connection is sealed by the glass after forming the zeolite separation membrane, whereby the glass is required to exhibit a high adhesion to the connection surface of the membrane. In addition, particularly when a gas conduit tube is connected to the separation membrane, an outer surface of the gas conduit tube is bonded to a cross-sectional surface of the separation membrane. Thus, in a case where the separation membrane has a relatively larger inner diameter as compared with the outer diameter of the gas conduit tube, only the glass sealant has to ensure a satisfactory physical strength, whereby a remarkably thick glass layer is needed in order to ensure a certain strength as the sealant to increase the amount of the glass used.

In the method of Patent Document 3, the O ring is used as the sealant in two positions. Therefore, the connection (the screwing portion or O ring-pressing portion) at each end of the zeolite separation membrane has an extremely complicated structure. Thus, the connection disadvantageously requires high processing accuracy, resulting in increased cost.

In Patent Document 4, the porous ceramic body having a large number of pores is designed for removing a suspended substance, bacterium, dust, etc. from a fluid. The proposed glass composition is free from zinc oxide in view of corrosion resistance in an acid (a citric acid solution) or an alkali (a sodium hypochlorite solution). Thus, the separation subject has a relatively large size, the glass is evaluated with respect to foam pressure, and the elution of the glass is not rigorously evaluated. In a case where a zeolite layer is formed on a porous ceramic tube by crystal growth to produce a zeolite separation membrane for selecting a separation subject at the molecular size (angstrom) level, a slight amount of a glass component can be eluted in a hydrothermal reaction for forming the zeolite layer (under heating and highly alkaline atmosphere) and can affect the zeolite crystal formation to deteriorate the membrane performance (the separation performance). To prevent the deterioration, demanded is a glass composition per se, which has little affect on the zeolite formation even when the glass component is eluted.

An object of the invention is to provide a zeolite separation membrane capable of solving the problems of the above conventional technologies, a method for producing the separation membrane, and a bonding agent used therein.

Means for Solving the Problems

A zeolite separation membrane according to the invention is characterized by comprising a porous tube containing an alumina as a main component and an attachment member disposed in a connection position of the porous tube, wherein the porous tube and the attachment member are bonded by a ceramic oxide-based bonding agent containing 17 to 48 wt % of $SiO_2$, 2 to 8 wt % of $Al_2O_3$, 24 to 60 wt % of BaO, and 0.5 to 5 wt % of ZnO as essential components and containing at least one of $La_2O_3$, CaO, and SrO, and a zeolite layer is formed on a surface of the porous tube.

In the zeolite separation membrane of the invention, for example, the attachment member may be a seal plug for sealing at least one end of the porous ceramic tube or a tube connected to at least one end of the porous ceramic tube.

In the zeolite separation membrane of the invention, for example, as shown in FIG. 6, an end of the attachment member is preferably connected to an end of the porous ceramic tube by fitting a convex portion into a concave portion.

In the zeolite separation membrane of the invention, the attachment member preferably has a thermal expansion coefficient of 4 to $9 \times 10^{-6}$ (/K), which is approximately equal to that of the porous ceramic tube. When the attachment member has a thermal expansion coefficient different from that of the porous ceramic tube, a coating on the outer surface of the connection is cracked or peeled in a burning step for forming the coating.

In the zeolite separation membrane of the invention, it is preferred that the attachment member contains 50 wt % or more of an alumina as a main component and has a glassy content of 0.1 to 40 wt % and the crystal particle diameters of the alumina and the ceramic oxide arer 1 μm or more.

In this case, the attachment member can have a thermal expansion coefficient approximately equal to that of the porous alumina tube in the separation membrane, whereby leakage of the ceramic oxide can be prevented under a highly alkaline atmosphere in the step of forming the zeolite layer. Thus, the connection surface of the attachment member and the porous tube can be prevented from cracking due to heat, so that the zeolite separation membrane can maintain a satisfactory physical strength.

FIG. 1 is a micrograph showing particles in the attachment member of the seal plug, and FIG. 2 is a view showing an example of particle diameter measurement. The substance separation is performed on the separation film having the zeolite layer, and it is necessary to prevent the permeation of a separation subject substance through the attachment member. When the attachment member has a microstructure with a particle diameter (a crystal particle diameter) of 1 μm or more after sintering, the pass of the separation subject substance through the attachment member can be prevented.

A method according to the invention for producing a zeolite separation membrane is characterized by comprising the steps of: placing a porous tube containing an alumina as a main component and an attachment member to be connected to the porous tube in a connection position; interposing a ceramic oxide-based bonding agent containing 17 to 48 wt % of $SiO_2$, 2 to 8 wt % of $Al_2O_3$, 24 to 60 wt % of BaO, and 0.5 to 5 wt % of ZnO as essential components and containing at least one of $La_2O_3$, CaO, and SrO between the porous tube and the attachment member; burning the bonding agent to bond the porous tube and the attachment member; and forming a zeolite layer on a surface of the porous tube.

In the zeolite separation membrane production method of the invention, it is preferred that the bonding agent is interposed in the form of a molded body or a slurry of a ceramic oxide powder between the porous tube and the attachment member, and then burned to bond the porous tube and the attachment member.

It is preferred that the molded body of the ceramic oxide powder contains a binder or is prepared by molding a material containing a binder and by then burning the material to remove the binder. The molded body of the ceramic oxide powder may be such that the ceramic oxide powder grains are bonded by the binder to maintain the shape. Before the molded body containing the binder is used in the separation membrane of the invention, it may be heated to remove the binder and to melt the glass, so that the molded shape may be maintained by the molten glass. Furthermore, the binder in the molded body may be burned and removed in the heating treatment for bonding the porous ceramic tube and the attachment member to reduce the heating process number.

In the zeolite separation membrane production method of the invention, the zeolite layer is preferably formed by hydrothermal synthesis on the surface of the porous ceramic tube.

It is preferred that the porous ceramic tube is immersed in a suspension of a zeolite particle and dried to attach the zeolite particle to the surface of the porous ceramic tube before the hydrothermal synthesis. In the separation membrane production method of the invention, the zeolite layer is formed on the surface of the porous tube after the attachment member is bonded to the porous tube. Even in a case where a small gap is formed in the connection boundary of the porous tube and the attachment member, the suspension of the zeolite particle (the starting material for the zeolite layer) penetrates into the gap in the step of immersing the connection surface therein, the zeolite particle is attached to the gap in the drying step, and the gap is filled with a grown zeolite crystal layer in the subsequent hydrothermal reaction, whereby the resulting connection surface can exhibit a high airtightness.

A bonding agent according to the invention for bonding a porous tube containing an alumina as a main component and an attachment member is characterized by comprising a ceramic oxide material containing 17 to 48 wt % of $SiO_2$, 2 to 8 wt % of $Al_2O_3$, 24 to 60 wt % of BaO, and 0.5 to 5 wt % of ZnO as essential components and containing at least one of $La_2O_3$, CaO, and SrO.

The bonding agent of the invention may further contain 0.1 to 20 wt % of an yttria-stabilized zirconia.

Typical examples of the ceramic oxides include glasses. The molded body of the ceramic oxide powder may be a ring such as a glass ring.

Advantage of the Invention

In the zeolite separation membrane production method of the invention, the attachment member is bonded to the porous tube before the formation of the zeolite layer. Therefore, the bonding agent can have a melting temperature higher than 600° C., which is the upper heatproof temperature limit of the zeolite. Thus, the ceramic oxide material for the bonding agent can be selected from a wider range of compositions such as glass compositions (without limitations on the glass softening temperature).

Even in a case where a small gap is formed in the connection boundary, since the zeolite layer is formed on the surface of the porous tube after the attachment member is bonded to the porous tube, the gap can be filled with the zeolite layer to achieve a highly reliable adhesion.

Furthermore, when an end of the attachment member is connected to an end of the porous ceramic tube by fitting, the physical strength can be increased not only by the bonding agent but also by the fitting, whereby the amount of the bonding agent used can be reduced.

The bonding agent of the invention comprises a ceramic oxide material containing 17 to 48 wt % of $SiO_2$, 2 to 8 wt % of $Al_2O_3$, 24 to 60 wt % of BaO, and 0.5 to 5 wt % of ZnO as essential components and containing at least one of $La_2O_3$, CaO, and SrO. Therefore, when the porous tube and the attachment member bonded by the bonding agent are immersed in the highly alkaline liquid in the step of forming the zeolite layer by the hydrothermal synthesis, a component in the bonding agent is not eluted into the liquid, and the bonding agent does not affect the resulting zeolite layer.

In the invention, the bonding agent used in the bonding step is free from lead in consideration of health and environment. Thus, a satisfactory airtightness can be achieved on the rough ceramic surface without using a bonding agent containing a component that may be eluted and adversely affect the zeolite layer in the operation of the separation membrane without using a coating material that requires a complicated applying process.

When the bonding agent having the above composition is used with the attachment member, the connection of the zeolite separation film and the attachment member can have a simple structure, the production costs can be reduced, and the specific mechanical strength and high airtightness of the ceramic can be maintained.

BEST MODE FOR CARRYING OUT THE INVENTION

Several Examples of the invention are cited below to specifically describe the invention.

Example 1

1) Bonding of Porous Ceramic Tube and Attachment Member (a) As shown in FIG. 3, a glass ring (2) prepared by compression-molding a glass powder was interposed between one end of a porous ceramic tube (1) (alumina 99%, outer diameter 16 mmφ, inner diameter 12 mmφ) and a seal plug (3) (dense alumina) to seal the tube (1) (see FIG. 3a). The glass powder used herein had the composition B shown in Table 2. The resultant was burned at 900° C. for 1 hour to obtain a structure with the one end of the tube (1) sealed.

(b) Then, the connection between the one end of the porous ceramic tube (1) and the seal plug (3) was immersed in a slurry of a glass powder having the composition B shown in Table 2 (50 wt % of the glass powder in ethanol solvent), and was then dried, to improve the strength and airtightness of the connection (see FIG. 3b). This was burned at 900° C. for 1 hour to prepare a structure with the outer surface of the connection covered with a glass coating (4).

2) Synthesis of Zeolite Separation Film

As shown in FIG. 4, the porous ceramic tube, which had the seal plug bonded to the one end thereof by the glass in the above manner, was immersed in a 0.10-wt % suspension of A-type zeolite crystal particles (ZEORUM available from Tosoh Corporation). The end of the porous ceramic tube having the zeolite crystal particles was left at the room temperature for 2 hours, and then dried at 37° C. overnight. The end having the zeolite was immersed in a reaction gel liquid having a composition of $Na_2O:SiO_2:Al_2O_3:H_2O=88:100:4:3960$, and hydrothermal synthesis was carried out at 100° C. for 4 hours in this state. A zeolite film was formed on the outer surface of the porous ceramic tube by the hydrothermal synthesis.

After the synthesis, the porous ceramic tube having the zeolite film was washed with pure water and dried at the room temperature for one day and night.

Zeolite separation membranes shown in FIGS. 4(a) and 4(b) corresponding to FIGS. 3(a) and 3(b) were produced in this manner. In the drawings, (1) represents the porous ceramic tube, (3) represents the seal plug, (4) represents the glass coating, (5) represents a molten glass layer, and (6) represents the zeolite layer.

The above zeolite separation membranes were subjected to an ethanol/water pervaporation test (a PV test) under the following conditions. An apparatus used in the test is shown in FIG. 5. In this drawing, (11) represents a stirrer, a constant-temperature bath (12) is mounted thereon, and each zeolite separation membrane (13) is placed in water in the bath (12). (14) represents a vacuum gauge, (15) represents a liquid nitrogen trap, (16) represents a vacuum trap, and (17) represents a vacuum pump.

PV test conditions:
Effective membrane area=10.1 cm$^2$
Ethanol/water=90 wt %/10 wt %
Reaction temperature=75° C.

The separation factor was calculated using the following equation.

Separation factor=$(C_{Water}/C_{EtOH})_{Permeation}/(C_{Water}/C_{EtOH})_{Supply}$ $C_{water}$: Water concentration
$C_{EtOH}$: Ethanol concentration Thus obtained test results are as follows.
Zeolite separation membrane of FIG. 4(a): separation factor 9986
Zeolite separation membrane of FIG. 4(b): separation factor 1381

It is clear from the results that, in both the zeolite separation membranes of FIGS. 4(a) and 4(b), the sealant in the connection exhibits a remarkably high airtightness and has little adverse affect on the membrane.

Example 2

The effect of stabilized zirconia addition to glass powder was examined by the following procedure.

Zeolite separation membranes were produced in the same manner as Example 1 except for using a glass powder prepared by adding a predetermined amount of a yttrium-stabilized zirconia (HYS-8 available from Daiichi Kigenso Kagaku Kogyo Co., Ltd.) to the composition B of Table 2 for the bonding agent and the coating described in "1) Bonding of porous ceramic tube and attachment member" of Example 1. The produced membranes were subjected to the ethanol/water pervaporation test (the separation factor test) in the same manner as Example 1.

The test results are shown in Table 1.

TABLE 1

| Zirconia amount | Separation factor |
|---|---|
| Not added | 1381 |
| 5 wt % | 4588 |
| 10 wt % | 3183 |
| 20 wt % | 1853 |
| 30 wt % | Cracked in burning step |

It is clear from the results that the zeolite separation membranes each using the glass added with 20 wt % or less of the stabilized zirconia are more excellent in the performance (the separation factor) than the membrane with no zirconium addition.

Example 3

The effect of glass powder composition on membrane performance was examined by the following procedure.

Zeolite separation membranes were produced in the same manner as Example 1 except for using a glass powder of a composition shown in Table 2 for the bonding agent and the coating described in "1) Bonding of porous ceramic tube and attachment member" of Example 1. The produced membranes were subjected to the ethanol/water pervaporation test (the separation factor test) in the same manner as Example 1. The test results are shown in Table 3.

It is clear from the results that, in all the zeolite separation membranes using the compositions A to D, the glass sealant in the connection exhibits a remarkably high airtightness and has little adverse affect on the membrane.

TABLE 2

| Ceramic oxide | Composition [wt %] | | | | | | | | | |
|---|---|---|---|---|---|---|---|---|---|---|
| | SiO$_2$ | Al$_2$O$_3$ | BaO | ZnO | La$_2$O$_3$ | CaO | SrO | Na$_2$O | K$_2$O | Other |
| A | 48 | 8 | 28 | 0.5 | 0 | 0 | 12 | 0 | 0 | 3.5 |
| B | 48 | 6 | 25 | 4 | 7 | 5 | 0 | 1 | 0.9 | 3.1 |
| C | 21 | 3 | 57 | 3 | 0 | 11 | 0.7 | 0 | 0 | 4.3 |
| D | 17 | 2 | 60 | 1 | 15 | 0 | 0.8 | 0 | 0 | 4.2 |
| E | 54 | 8 | 29 | 4 | 0 | 0 | 0 | 0 | 0 | 5 |
| F | 30.8 | 1.4 | 48.7 | 0 | 0 | 0 | 0 | 10.3 | 0 | 8.8 |
| G | 64.9 | 0 | 9.6 | 2 | 0.3 | 0 | 0 | 5.2 | 15.2 | 2.8 |
| H | 46 | 3 | 0 | 4 | 0 | 0 | 20.6 | 0 | 12 | 14.4 |

TABLE 3

| Coating glass | Separation factor |
|---|---|
| A | 5524 |
| B | 1317 |
| C | 2740 |
| D | 2383 |
| E | 340 |
| F | 115 |
| G | 103 |
| H | 187 |

Example 4

The effects of the composition and thermal expansion coefficient of the attachment member on coating state (adhesion and airtightness) were examined by the following procedure.

First, tube-shaped attachment members A to G having different compositions and different thermal expansion coefficients were prepared. As shown in FIG. 6, one end of each attachment member (21) was cut to form a step (21a) and a small-diameter portion (21b) having an outer diameter smaller than those of the other portions, such that the one end could be inserted into an end of a porous alumina tube (1) (alumina 99.6%, outer diameter φ 16 mm, inner diameter φ 12 mm). The one end of the attachment member (21) was inserted into the end of the porous alumina tube (1), and a glass ring (2) was interposed between the surfaces of the step (21a) of the attachment member (21) and the porous alumina tube (1).

The outer surface of the connection was covered with a glass coating (4) in the same manner as "1) Bonding of porous ceramic tube and attachment member" of Example 1. That is, it was dried at 100° C. overnight, heated to 1000° C. at a heating rate of 10° C./min, maintained at this temperature for 1 hour, and cooled to the room temperature at a cooling rate of 1° C./min, to obtain a structure shown in FIG. 6. Then, a zeolite film was formed by hydrothermal synthesis on an outer surface of the porous ceramic tube in the same manner as "2) Synthesis of zeolite separation film" of Example 1. At this stage, the coating state of the connection was visually observed. The results are shown in Table 5.

As a result, when the attachment member had a thermal expansion coefficient different from that of the porous ceramic tube, the coating was cracked or peeled in the burning step for forming the coating on the outer surface of the connection. Thus, the attachment member is required to have a thermal expansion coefficient of 4 to 9×10$^{-6}$ (/K), which is approximately equal to that of the porous ceramic tube, to contain 50 wt % or more of an alumina as a main component, and to have a glassy content of 0.1 to 40 wt %.

The produced membranes were subjected to the ethanol/water pervaporation test (a separation factor test) in the same manner as Example 1. The test results are shown in Table 6. It is clear from the table that the membranes using the attachment members A to D exhibit a high separation performance, and the composition of the attachment member has little adverse affect on the zeolite layer formation.

TABLE 4

Composition and thermal expansion coefficient of attachment member

| Attachment member | Composition [wt %] | | | | | | Thermal expansion coefficient × 10$^{-6}$ [/K] |
|---|---|---|---|---|---|---|---|
| | SiO$_2$ | Al$_2$O$_3$ | CaO | MgO | ZrO$_2$ | Si$_3$N$_4$ | |
| A | 40 | 56 | — | — | — | — | 4.9 |
| B | 30 | 69 | — | — | — | — | 5.8 |
| C | 3 | 95 | — | — | — | — | 7.8 |
| D | 0.1 | 99.6 | — | — | — | — | 8.1 |
| E | — | — | 5 | — | 93 | — | 12 |
| F | — | — | 2 | 96 | — | — | 13 |
| G | — | — | — | — | — | 97 | 2.6 |

TABLE 5

Coating state depending on composition and thermal expansion coefficient of attachment member

| Attachment member | Coating state |
|---|---|
| A | Excellent |
| B | Excellent |
| C | Excellent |
| D | Excellent |
| E | Cracked |
| F | Cracked |
| G | Cracked |

TABLE 6

Effects of composition and thermal expansion coefficient of attachment member on membrane performance (separation performance)

| Coating glass | Separation factor |
|---|---|
| A | 3506 |
| B | 3990 |
| C | 5626 |
| D | 5524 |
| E | Unmeasurable |
| F | Unmeasurable |
| G | Unmeasurable |

Example 5

Modification end structure examples of porous ceramic tubes and attachment members are shown in FIGS. 7(a), 7(b), 7(c), and 7(d). In the drawings, (1) represents a porous ceramic tube, (2) represents a bonding agent, (3) represents a seal plug, (4) represents a glass coating, (18) represents a seal cap, and (21) represents an attachment member.

A zeolite film was formed by hydrothermal synthesis on an outer surface of each porous ceramic tube in the same manner as "2) Synthesis of zeolite separation film" of Example 1.

Figure 1:
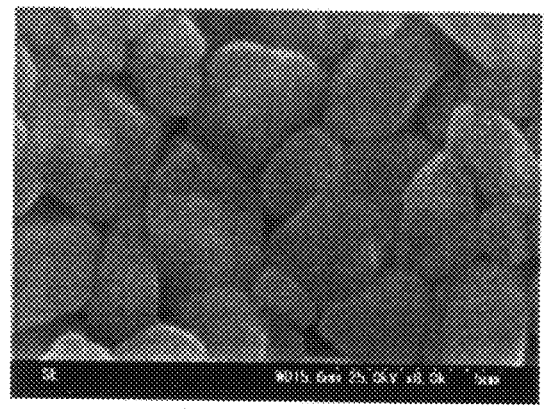
FIG. 1 is a micrograph showing particles in an attachment member of a seal plug.
Figure 2:
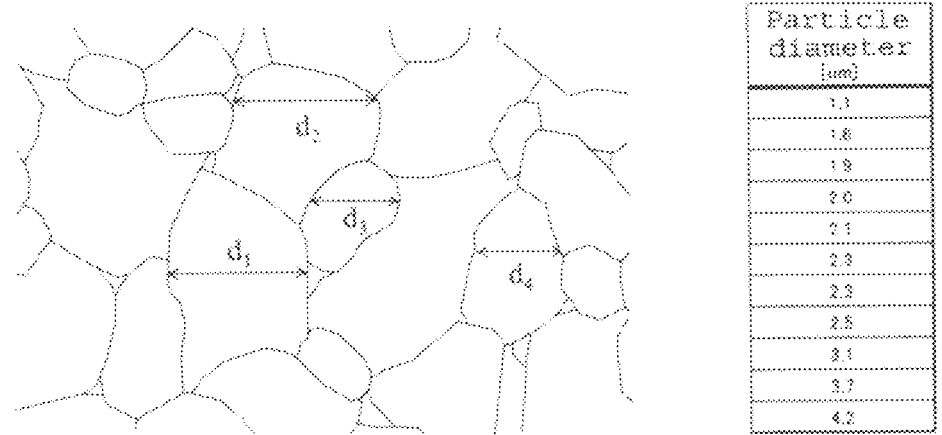
FIG. 2 is a schematic view showing particle diameter measurement of the seal plug.
Figure 3:
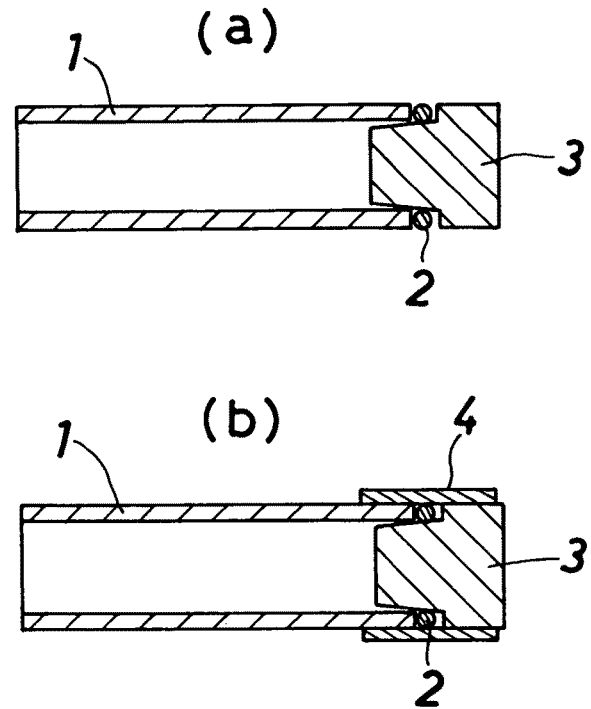
FIGS. 3(a) and 3(b) are each a schematic view showing a bonding structure of a porous ceramic tube and an attachment member.
Figure 4:
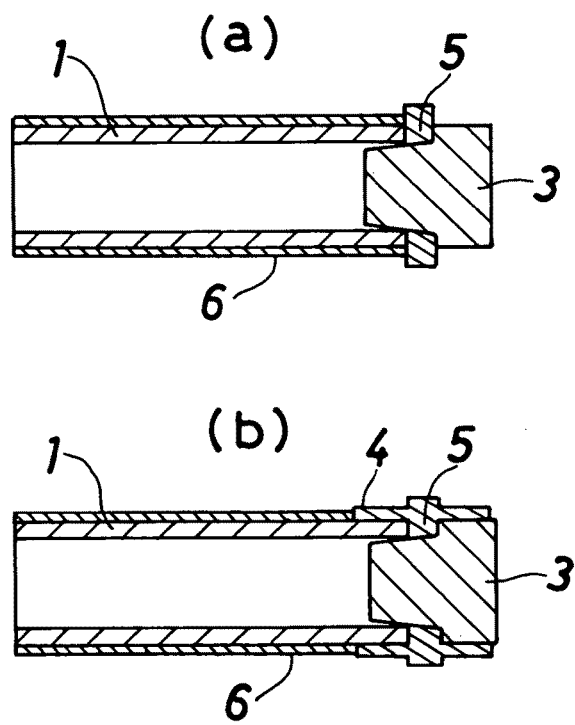
FIGS. 4(a) and 4(b) are each a schematic view showing synthesis of a zeolite separation film.
Figure 5:
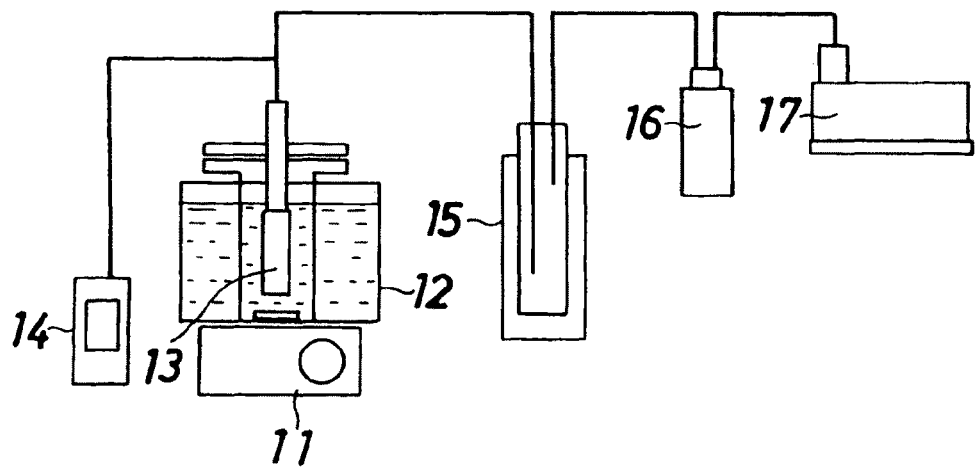
FIG. 5 is a schematic view showing an apparatus for an ethanol/water pervaporation test (a PV test)
Figure 6:
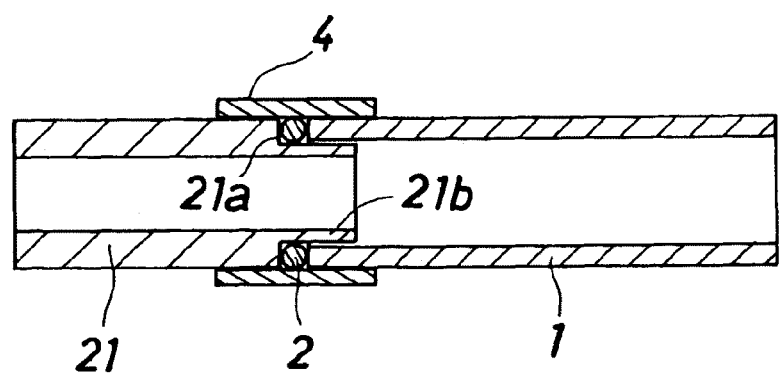
FIG. 6 is a schematic view showing a bonding structure of a porous ceramic tube and an attachment member.
Figure 7:
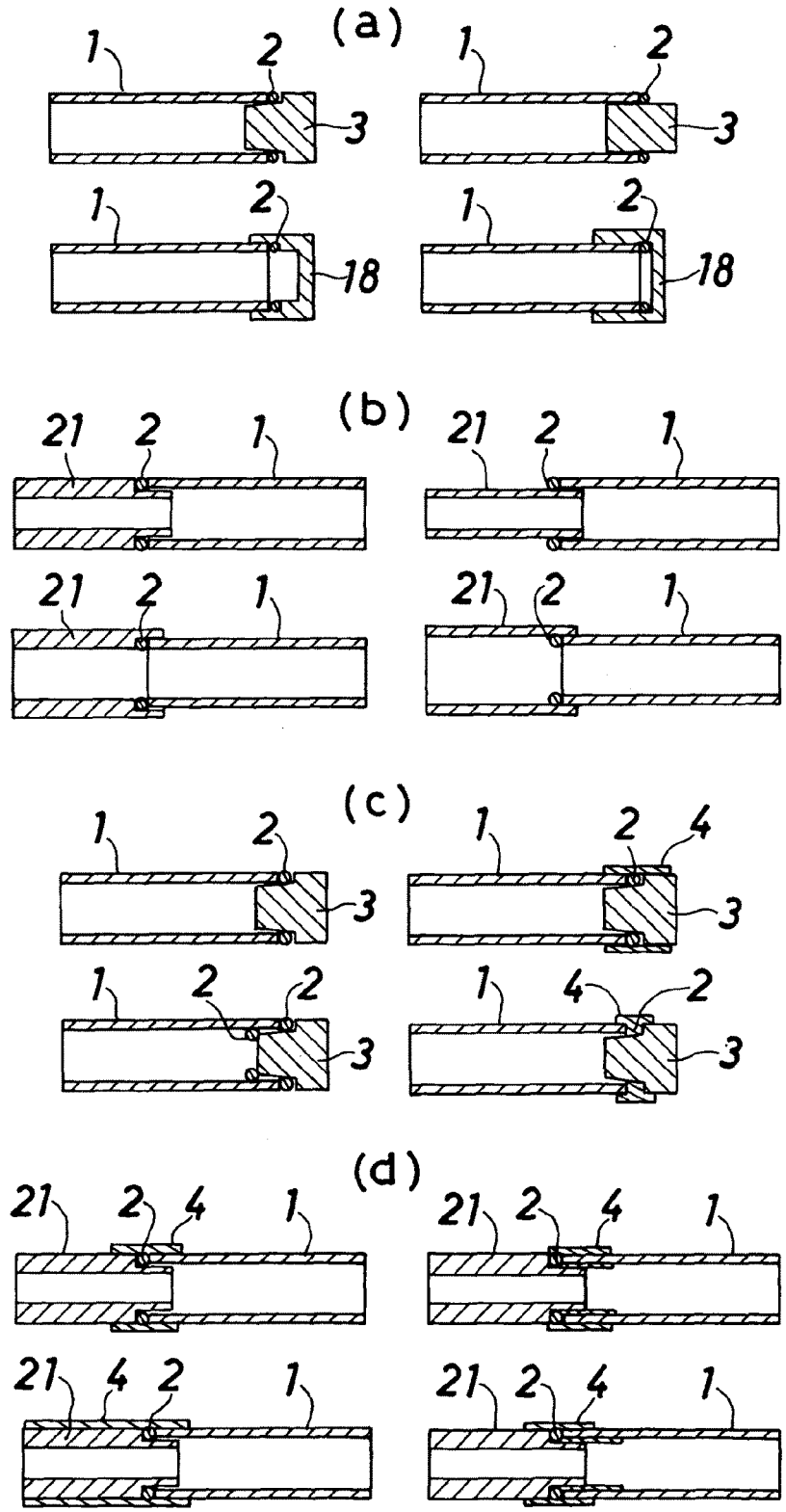
FIGS. 7(a), 7(b), 7(c), and 7(d) are each a schematic view showing modification end structure examples of porous ceramic tubes and attachment members.

DESCRIPTION OF REFERENCE NUMERALS AND SIGNS (1) Porous ceramic tube
(2) Glass ring
(3) Seal plug
(4) Glass coating
(5) Molten glass layer
(6) Zeolite layer
(18) Seal cap
(21) Attachment member

The invention claimed is:

1. A separation membrane characterized by comprising a porous tube containing an alumina as a main component and an attachment member being disposed in a connection position of the porous tube,
   wherein the attachment member contains 50 wt % or more of an alumina as a main component and has a thermal expansion coefficient of 4 to $9\times10^{-6}$ (/K);
   wherein the porous tube and the attachment member are bonded by a ceramic oxide-based bonding agent containing 17 to 48 wt % of $SiO_2$, 2 to 8 wt % of $Al_2O_3$, 24 to 60 wt % of BaO, and 0.5 to 5 wt % of ZnO as essential components, containing at least one of $La_2O_3$, CaO, and SrO, and further containing 0.1 to 20 wt % of an yttria-stabilized zirconia; and
   wherein a thin zeolite layer is formed on a surface of the porous tube.

2. The separation membrane according to claim 1, characterized in that the attachment member is a seal plug for sealing at least one end of the porous ceramic tube or a tube connected to at least one end of the porous ceramic tube.

3. The separation membrane according to claim 1, characterized in that an end of the attachment member is connected to an end of the porous ceramic tube by fitting.

4. The separation membrane according to claim 1, characterized in that the attachment member has a ceramic oxide content of 0.1 to 40 wt %, wherein the crystal particle diameters of the alumina and the ceramic oxide are 1 pm or more.

5. A method for producing a separation membrane, characterized by comprising the steps of:
   placing a porous tube containing an alumina as a main component and an attachment member to be connected to the porous tube in a connection position;
   interposing a ceramic oxide-based bonding agent between the porous tube and the attachment member;
   burning the bonding agent to bond the porous tube and the attachment member; and
   after the attachment member is bonded to the porous tube forming a zeolite layer on a surface of the porous tube,
   wherein the attachment member contains 50 wt % or more of an alumina as a main component and has a thermal expansion coefficient of 4 to $9\times10^{-6}$ (/K); and
   wherein the ceramic oxide-based bonding agent contains 17 to 48 wt % of $SiO_2$, 2 to 8 wt % of $Al_2O_3$, 24 to 60 wt % of BaO, and 0.5 to 5 wt % of ZnO as essential components at least one of $La_2O_3$, CaO, and SrO, and further 0.1 to 20 wt % of an yttria-stabilized zirconia.

6. The separation membrane production method according to claim 5, characterized in that the bonding agent is interposed in the form of a molded body or a slurry of a ceramic oxide powder between the porous tube and the attachment member, and then burned to bond the porous tube and the attachment member.

7. The separation membrane production method according to claim 6, characterized in that the molded body of the ceramic oxide powder contains a binder, or alternatively the molded body is prepared by molding a material containing a binder and by then burning the material to remove the binder.

8. The separation membrane production method according to claim 7, characterized in that the porous ceramic tube is immersed in a suspension of a zeolite particle and dried to attach the zeolite particle to the surface of the porous ceramic tube, and then hydrothermal synthesis is carried out to form the zeolite layer on the surface.

* * * * *